US010255154B1

United States Patent
Gershman

(10) Patent No.: US 10,255,154 B1
(45) Date of Patent: Apr. 9, 2019

(54) IMPLEMENTING A TEST MODE OF OPERATION IN A COMPUTING DEVICE FOR SIMPLE NETWORK MANAGEMENT PROTOCOL

(71) Applicant: Lockheed Martin Corporation, Bethesda, MD (US)

(72) Inventor: Vladimir Gershman, Holland, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 153 days.

(21) Appl. No.: 15/337,200

(22) Filed: Oct. 28, 2016

Related U.S. Application Data

(60) Provisional application No. 62/248,510, filed on Oct. 30, 2015.

(51) Int. Cl.
| | |
|---|---|
| *G06F 11/26* | (2006.01) |
| *G06F 11/263* | (2006.01) |
| *G06F 11/22* | (2006.01) |
| *H04L 12/24* | (2006.01) |

(52) U.S. Cl.
CPC ........ *G06F 11/263* (2013.01); *G06F 11/2247* (2013.01); *G06F 11/2273* (2013.01); *H04L 41/0213* (2013.01)

(58) Field of Classification Search
CPC ............................. G06F 11/263; G06F 11/2247
USPC .......................................................... 714/33
See application file for complete search history.

(56) References Cited

U.S. PATENT DOCUMENTS

| | | | | |
|---|---|---|---|---|
| 6,507,564 B1* | 1/2003 | Merchant | ................ | H04L 43/50 370/244 |
| 7,039,724 B1* | 5/2006 | Lavian | ................ | H04L 41/0213 707/999.001 |
| 7,454,743 B2* | 11/2008 | Fuchs | ................ | G06F 9/44505 717/106 |
| 7,478,403 B1* | 1/2009 | Allavarpu | ........... | H04L 41/0206 370/254 |
| 2008/0101419 A1* | 5/2008 | Suriyanarayanan | ......... | H04L 41/0853 370/503 |
| 2010/0195509 A1* | 8/2010 | Davis | ..................... | H04L 43/10 370/250 |

\* cited by examiner

*Primary Examiner* — Kamini B Patel
(74) *Attorney, Agent, or Firm* — Withrow & Terranova, PLLC

(57) ABSTRACT

Mechanisms for implementing a test mode of operation in a computing device are disclosed. A first request to set a read-only object variable maintained by the computing device to a first value is received. It is determined that a current mode of operation of a plurality of different modes of operation is a test mode of operation. Based on determining that the current mode of operation is the test mode of operation, the read-only object variable is set to the first value.

20 Claims, 5 Drawing Sheets

IMPLEMENTING A TEST MODE OF OPERATION IN A COMPUTING DEVICE FOR SIMPLE NETWORK MANAGEMENT PROTOCOL

RELATED APPLICATION

This application claims the benefit of provisional patent application Ser. No. 62/248,510, filed on Oct. 30, 2015, entitled "NETWORK DEVICE AND METHOD FOR TESTING THE SAME USING SIMPLE NETWORK MANAGEMENT PROTOCOL," the disclosure of which is hereby incorporated herein by reference in its entirety.

TECHNICAL FIELD

The embodiments relate generally to managing computing devices with simple network management protocol (SNMP), and in particular to implementing a test mode of operation in a computing device that uses SNMP.

BACKGROUND

Simple network management protocol (SNMP) is a protocol that facilitates centralized management of computing devices that are communicatively coupled to a network. Each managed computing device includes an SNMP agent that maintains a management information base (MIB) that contains managed objects, referred to herein as object variables, for storing information. Object variables are identified by an object identifier (01D). The particular information that is maintained may depend in part on the particular computing device. For example, a printer computing device may include a MIB that contains object variables that store the number of lines printed by the printer, an amount of remaining toner, a firmware level, or the like. A general purpose computing device may include a MIB that contains an object variable that identifies a current temperature of a processor device of the computing device.

A management device, sometimes referred to as a network management station (NMS), can query the computing devices by sending SNMP commands to the respective SNMP agents that request information maintained in the corresponding MIBs. For example, the management device may send an SNMP "GET Request" protocol data unit (PDU) to a computing device to request the object variable that identifies the temperature of the processing device of the computing device. In response, the SNMP agent accesses the MIB, retrieves the corresponding temperature value, and sends the temperature value to the management device.

When a MIB is initially defined, each object variable is given an access type, such as read-only, read-write, write-only, or the like. Read-write object variables may be written to by the management device via an SNMP command, such as a "SET Request" command. A read-only object variable cannot be written to. For example, an object variable that maintains a temperature of the processor device may be read-only to prevent changes to the object variable via SNMP.

Object variables in a MIB may have expected values, and a non-desirable value outside of such expected values may cause an exception handling process to occur. For example, a non-desirable value may be reported asynchronously by the computing device to the management device using a Trap PDU. Alternatively, the management device may determine that an object variable has an undesirable value by actively monitoring corresponding object variables, and upon such determination, may issue a warning message to a network operator, for example. Where such object variables have an access type of read-only, testing such exception processes and verifying NMS logic can be challenging. A user may need to manipulate the computing device to cause the object variable to have a non-desirable value. For example, in the case of an object variable that maintains the temperature of a processing device, the computing device may need to be manipulated to increase the temperature of the processing device to a non-desirable value. This may be impractical and/or may physically damage the computing device.

SUMMARY

The embodiments relate to a computing device and method for testing the same using simple network management protocol (SNMP). In a non-limiting embodiment, an SNMP agent of a computing device allows for read-only object variables to be changed while in a test mode of operation to properly test exception handling processes. For example, in the non-limiting embodiment, a read-only object variable can be changed to have a non-desirable value during the test mode of operation. Among other advantages, the embodiments eliminate a need to force a physical change to a computing device that may damage the computing device in order to test exception handling processes.

In one embodiment a method for implementing a test mode of operation in a computing device is provided. The method includes receiving a first request to set a read-only object variable maintained by the computing device to a first value. The method further includes determining, by the computing device, that a current mode of operation of a plurality of different modes of operation is a test mode of operation. The method further includes setting the read-only object variable to the first value based on determining that the current mode of operation is the test mode of operation.

In another embodiment a computing device is provided. The computing device includes a communication interface configured to communicate with a network, and a processor device coupled to the communication interface. The processor device is configured to receive a first request to set a read-only object variable maintained by the computing device to a first value. The processor device is further configured to determine that a current mode of operation of a plurality of different modes of operation is a test mode of operation. The processor device is further configured to, based on determining that the current mode of operation is the test mode of operation, set the read-only object variable to the first value.

In another embodiment, a computer program product for implementing a test mode of operation in a computing device is provided. The computer program product is stored on a non-transitory computer-readable storage medium and includes instructions to cause a processor device to receive a first request to set a read-only object variable maintained by the computing device to a first value. The instructions further cause the processor device to determine that a current mode of operation of a plurality of different modes of operation is a test mode of operation. The instructions further cause the processor device to, based on determining that the current mode of operation is the test mode of operation, set the read-only object variable to the first value.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first request" and "second request," and does not imply a priority, a type, an importance, or other attribute, unless otherwise stated herein.

As used herein and in the claims, the articles "a" and "an" in reference to an element refers to "one or more" of the element unless otherwise explicitly specified.

The embodiments relate to a computing device and method for testing the same using simple network management protocol (SNMP). In a non-limiting embodiment, an SNMP agent of a computing device allows for read-only object variables to be changed while in a test mode of operation to properly test exception handling conditions and/or processes. For example, in the non-limiting embodiment, a read-only object variable can be changed to have a non-desirable value during the test mode of operation. Among other advantages, the embodiments eliminate a need to force a physical change to a computing device that may damage the computing device in order to test exception handling conditions and/or processes.

The embodiments also eliminate a need to use specialized software to simulate such exception handling conditions and/or processes. Such specialized software often creates logistical challenges. For example, the simulation software may use the same IP address as the actual device under test, necessitating removal of the device from the network while being tested, which may invalidate testing of the actual device. The embodiments allow the use of simple SNMP SET commands to put the device under test into the exception condition and to verify network management station (NMS) logic used to discover the fault. Such SNMP commands are often part of an operating system and thus do not require extra cost or the installation of additional software.

Figure 1:
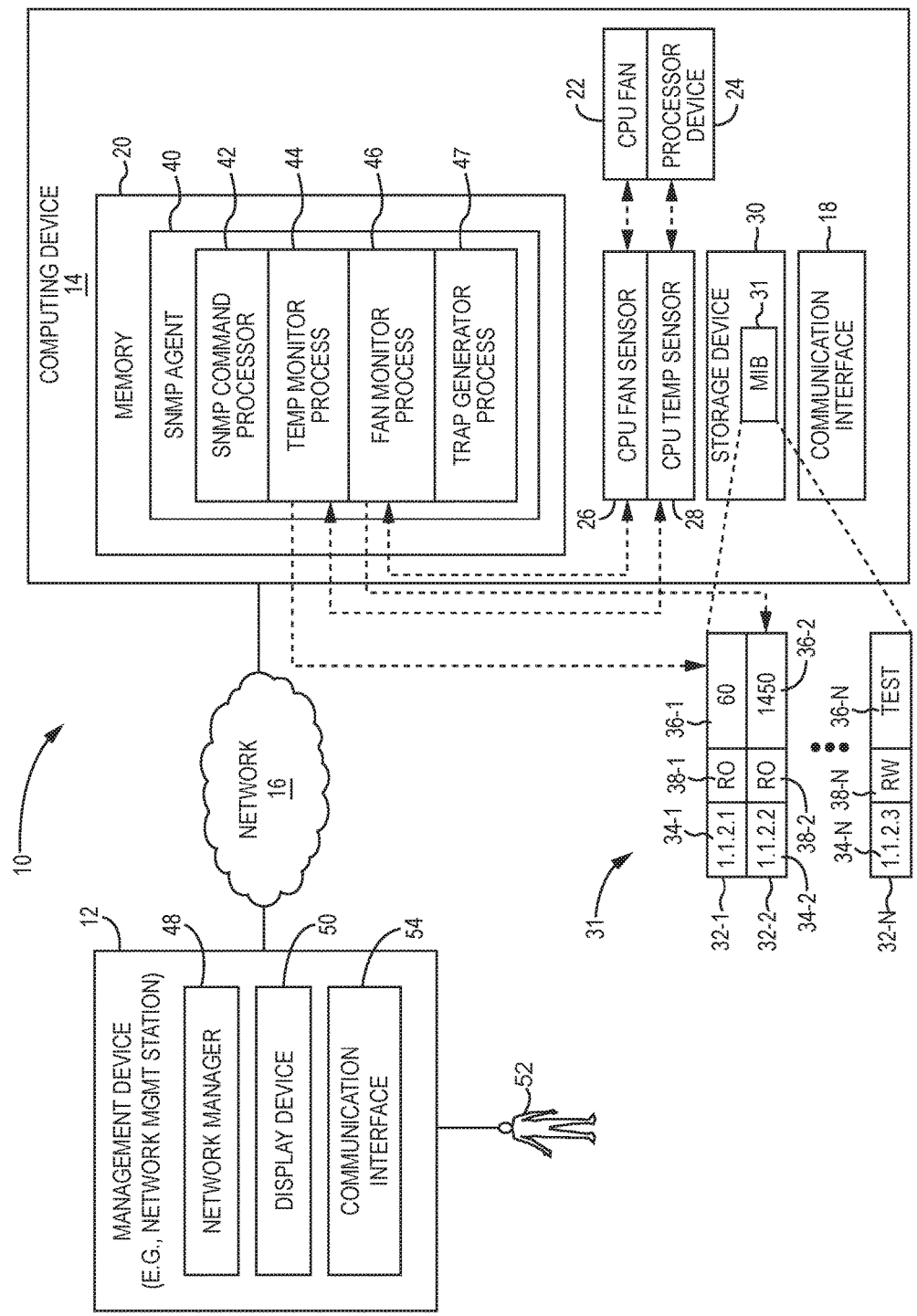
FIG. 1 is a block diagram of an environment in which embodiments may be practiced.

FIG. 1 is a block diagram of a system 10 in which embodiments may be practiced. The system 10 includes a management device 12, a computing device 14, and a network 16 via which the management device 12 and the computing device 14 can communicate with one another. While for purposes of illustration only a single computing device 14 is shown, in practice, the system 10 may include tens, hundreds, or thousands of computing devices 14.

The computing device 14 includes a communication interface 18 that is configured to communicate with the network 16. The computing device 14 further includes a memory 20 in which a plurality of components and data may be stored. The computing device 14 includes a Central Processing Unit (CPU) fan 22 that cools a processor device 24. A CPU fan sensor 26 quantifies a current sensed characteristic that is variable over time, which, in this example, is the rotational speed of the CPU fan 22. A CPU temperature sensor 28 also quantifies a current sensed characteristic that is variable over time, which, in this example, is the temperature of the processor device. Although not illustrated, the computing device 14 may have any number of sensors that quantify sensed characteristics, including, by way of non-limiting example, moisture, voltage, optical emission power, number of incoming and/or outgoing network packets, module presence, disk drive status, and the like.

The computing device 14 includes, or is communicatively coupled to, a storage device 30 that stores information, including a management information base (MIB) 31. The MIB 31 contains a plurality of entries 32-1-32-N (generally, entries 32). The entries 32-1-32-N include respective object identifiers (OIDs) 34-1-34-N that uniquely identify the respective entries. The entries 32-1-32-N also contain object variables 36-1-36-N that store a value associated with that particular entry 32. For example, the entry 32-1 includes an object variable 36-1 that maintains the current temperature of the processor device 24. The entry 32-2 includes an object variable 36-2 that maintains the current rotational speed of the CPU fan 22. The entry 32-N includes an object variable 36-N that maintains a current mode of operation of the computing device 14. The entries 32-1-32-N also identify an access status 38-1-38-N (generally, access status 38) of the corresponding object variables 36-1-36-N. The access status 38 identifies how the corresponding object variable 36 can be accessed via an SNMP command. For example, the access status 38-1 identifies the object variable 36-1 as having a read-only (RO) access status, which means that the object variable 36-1 cannot be modified (e.g., written to) by the management device 12 via an SNMP command, but can be read by the management device 12 via an SNMP command. Similarly the access status 38-2 identifies the object variable 36-2 as having a read-only (RO) access status, which means that the object variable 36-2 also cannot be modified (e.g., written to) by the management device 12 via an SNMP command, but can be read by the management device 12 via an SNMP command. The access status 38-N identifies the object variable 36-N as having a read-write (RW) access status, which means that the object variable 36-N can be read or written by the management device 12 via an SNMP command.

While for purposes of illustration only three entries 32 are illustrated, in practice, the MIB 31 may contain tens, hundreds, or thousands of entries 32.

The memory 20 may also contain an SNMP agent 40 that communicates via SNMP commands, with the management device 12. The SNMP agent 40 may include an SNMP command processor 42 that receives SNMP commands from the management device 12 and implements the SNMP commands. The SNMP agent 40 may also include a temperature monitor process 44 that continuously receives, from the CPU temperature sensor 28, information that quantifies the current temperature of the processor device 24. The temperature monitor process 44 also continuously updates the object variable 36-1 with a value that quantifies the current temperature.

Thus, although the object variable 36-1 is read-only with respect to SNMP commands, the object variable 36-1 is writable by the temperature monitor process 44. The temperature monitor process 44 may update the object variable 36-1 at any desired rate, such as every 5 milliseconds, every 500 milliseconds, every second, or the like. While solely for purposes of illustration the temperature monitor process 44 is illustrated as being part of the SNMP agent 40, in other embodiments the temperature monitor process 44 may be independent of the SNMP agent 40.

The SNMP agent 40 may also include a fan monitor process 46 that continuously receives, from the CPU fan sensor 26, the current rotational speed of the CPU fan 22. The fan monitor process 46 also continuously updates the object variable 36-2 with the rotational speed of the CPU fan 22. Thus, again, although the object variable 36-2 is read-only with respect to SNMP commands, the object variable 36-2 is writable by the fan monitor process 46. The fan monitor process 46 may update the object variable 36-2 at any desired rate, such as every 5 milliseconds, every 500 milliseconds, every second, or the like. While solely for purposes of illustration the fan monitor process 46 is illustrated as being part of the SNMP agent 40, in other embodiments the fan monitor process 46 may be independent of the SNMP agent 40.

The SNMP agent 40 may also include a trap generator process 47 that monitors the values of the object variables 36, and, if a value is outside of a desirable range of values, performs an action. For example, the trap generator process 47 may generate a message and cause the message to be communicated to the management device 12. Such desirable range of values may be maintained, for example, in the MIB 31, or another structure (not illustrated) stored in the storage device 30.

Because the SNMP agent 40, the SNMP command processor 42, the temperature monitor process 44, the fan monitor process 46, and the trap generator process 47 are components of the computing device 14, functionality performed by any such components may be attributed herein to the computing device 14 generally. Moreover, in embodiments where such components are complex computing instructions that program the processor device 24 to implement functionality, functionality performed by any such components may be attributed to the processor device 24.

The management device 12, in one embodiment, includes a network manager 48 that issues SNMP commands to the computing device 14, and receives responses to the SNMP commands from the computing device 14, via the SNMP agent 40. The network manager 48, based on such responses, may present information on a display device 50, for viewing, for example, by an operator 52. The management device 12 may also include a communication interface 54 that is configured to communicate with the network 16.

Assume for purposes of illustration that the trap generator process 47 has been designed to generate and cause a message to be sent to the management device 12 if the object variable 36-1 has a value greater than 100, which would indicate a temperature of the processor device 24 of 100 degrees celsius (C). Moreover, upon receipt of such a message, the management device 12 has been designed to generate a warning message for display on the display device 50 and cause the sounding of an audible alarm. To test the trap generator process 47 and the management device 12, the object variable 36-1 must be given a value greater than 100. However, because the object variable 36-1 has an access type of read-only, the management device 12 cannot set the value of the object variable 36-1. Thus, conventionally, the computing device 14 must be manipulated to cause the temperature of the processor device 24 to exceed 100 degrees celsius, such as by running a number of highly processor intensive tasks on the computing device 14 to attempt to cause the processor device 24 to heat up, or by inhibiting operation of the CPU fan 22, or via some other mechanism. Unfortunately, causing the processor device 24 to heat to a temperature that exceeds 100 degrees celsius may damage the processor device 24.

The embodiments implement different modes of operation such that during a test mode of operation, the read-only access status of a read-only object variable 36 may be ignored, and may be written to via an SNMP command issued by the management device 12. Among other advantages, this facilitates testing of exception handling processing without risking damage to the computing device 14.

Figure 2:
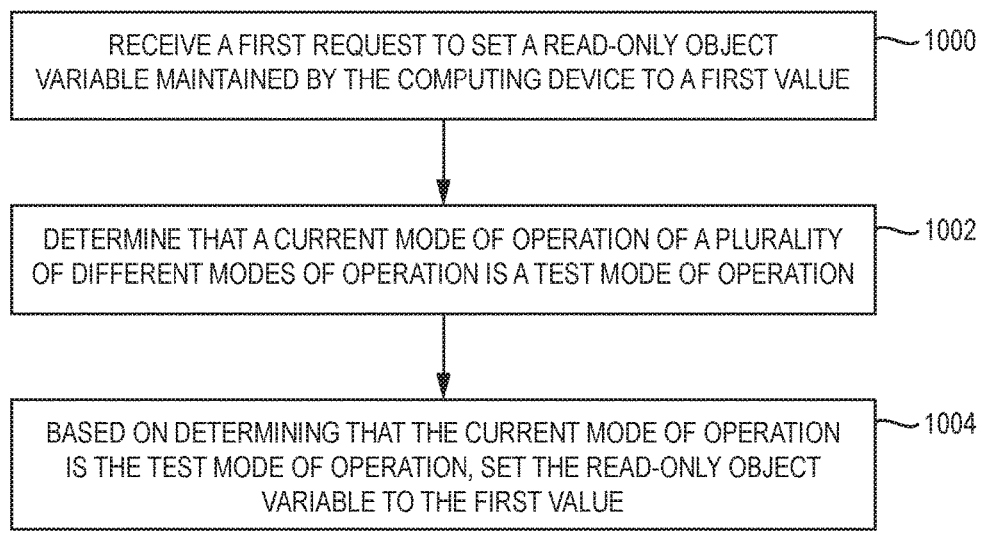
FIG. 2 is a flowchart of a method for implementing a test mode of operation according to one embodiment.

FIG. 2 is a flowchart of a method for implementing a test mode of operation according to one embodiment. FIG. 2 will be discussed in conjunction with FIG. 1. The computing device 14 receives a first request from the management device 12 to set the read-only object variable 36-1 maintained by the computing device 14 to a first value (FIG. 2, block 1000). The computing device 14 determines that a current mode of operation of a plurality of different modes of operation is a test mode of operation (FIG. 2, block 1002). In one example, the mode of operation may be settable via the management device 12, and may be maintained in an object variable 36, such as the object variable 36-N. Thus, to determine the current mode of operation, the computing device 14 accesses the object variable 36-N. In other embodiments, however, the current mode of operation may be, for example, a configuration option that the SNMP agent 40 accesses upon initiation, or may be settable in any other desirable manner. The computing device 14 may also verify that an originator of the first request is authorized to set the read-only object variable 36-1 to the first value. The computing device 14 may verify that the originator is authorized to modify the read-only object variable 36-1 by, for example, verifying that the operator 52 is authorized to access the operating system of the computing device 14 with root access or with a special type of administrative account, or by verifying the identity of the network manager 48 against an internal database (not shown) or an authentication server (not shown) via the network 16. Based on determining that the current mode of operation is the test mode of operation, the computing device 14 sets the read-only object variable 36-1 to the first value (FIG. 2, block 1004).

Figure 3A:
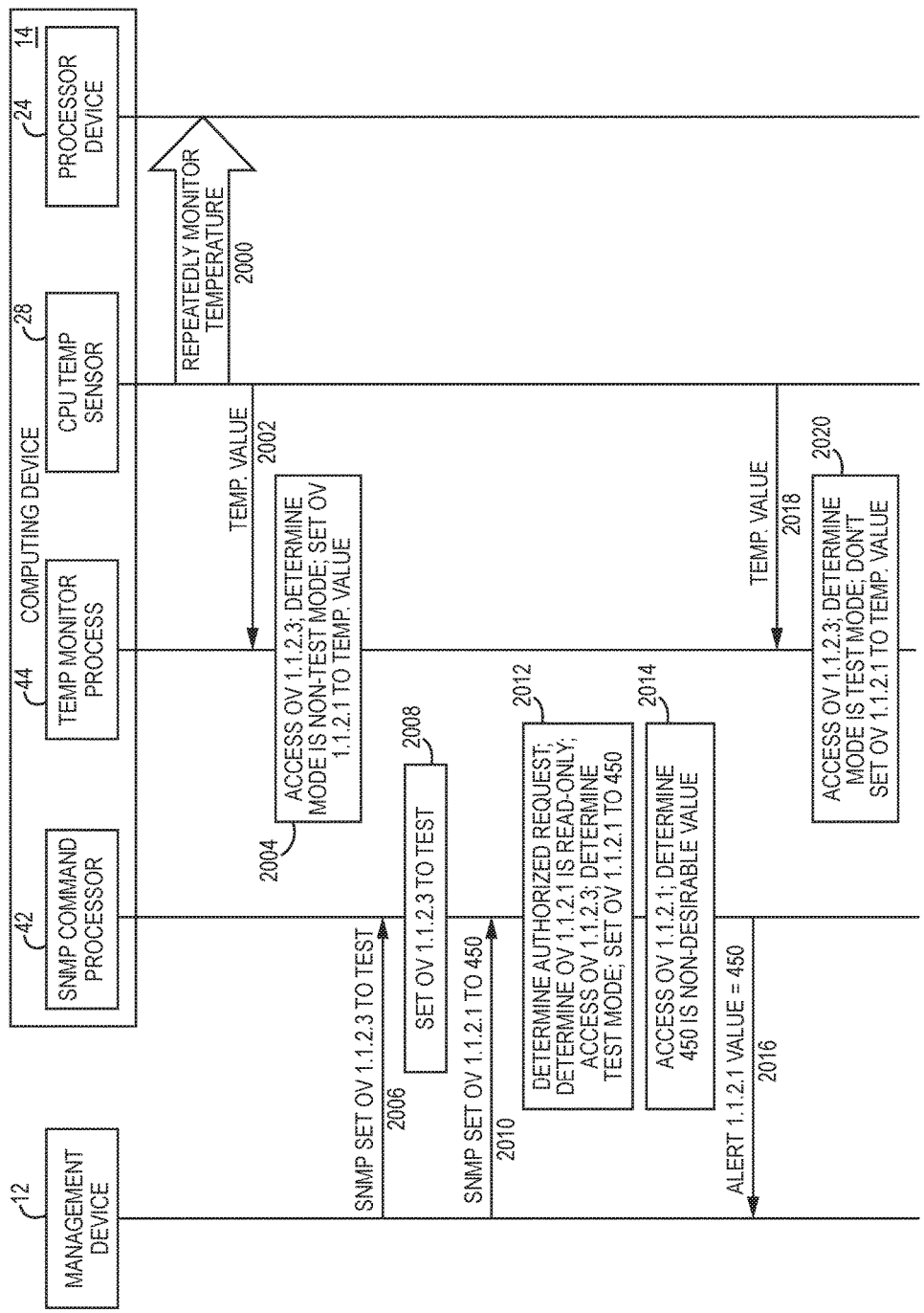
FIGS. 3A-3B are a message flow diagrams illustrating various processing and message flows for implementing a test mode of operation according to some embodiments.
Figure 3B:
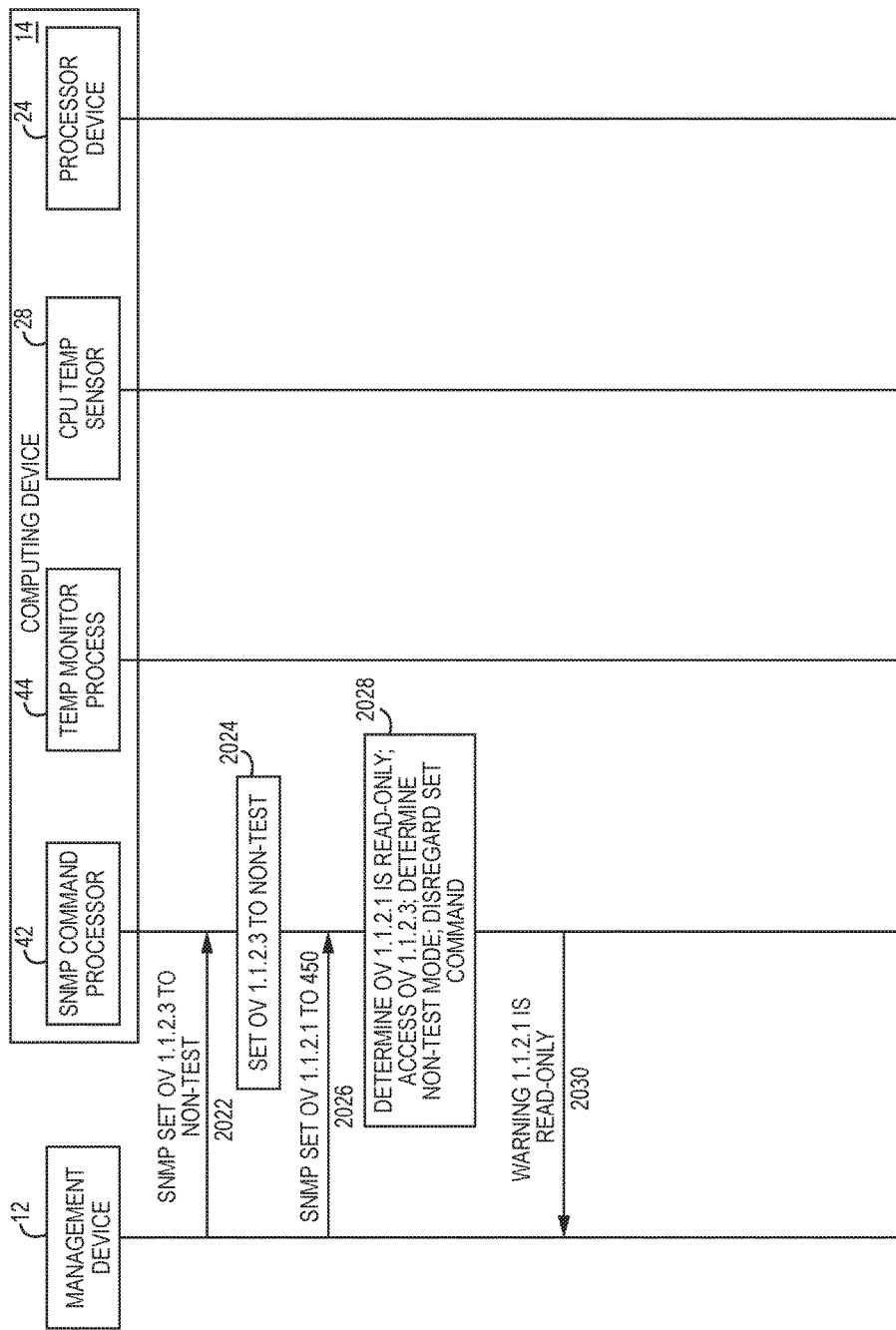

FIGS. 3A-3B are message flow diagrams illustrating various processing and message flows for implementing a test mode of operation according to some embodiments. FIGS. 3A-3B will be discussed in conjunction with FIG. 1. Referring first to FIG. 3A, the CPU temperature sensor 28 continuously determines the temperature of the processor device 24 (step 2000). The CPU temperature sensor 28 also continuously provides the temperature of the processor device 24 to the temperature monitor process 44 (step 2002). In one embodiment, prior to updating the object variable 36-1 with the current temperature, the temperature monitor process 44 accesses the object variable 36-N to determine the current mode of operation. For purposes of illustration, assume that the current mode of operation is a non-test mode. In response to determining that the current mode of operation is the non-test mode, the temperature monitor process 44 sets the object variable 36-1 to the current temperature obtained from the CPU temperature sensor 28 (step 2004).

The SNMP command processor 42 receives, from the management device 12, an SNMP SET command to set the object variable 36-N to a value of TEST to put the computing device 14 into a test mode of operation (step 2006). Because the access status 38-N of the object variable 36-N is read-write (RW), the SNMP command processor 42 sets the object variable 36-N to have a value of TEST (step 2008). The SNMP command processor 42 then receives, from the management device 12, an SNMP SET command to set the object variable 36-1 to a value of 450 (step 2010). The SNMP command processor 42 may, in one embodiment, first determine that the originator of the SET request is authorized based on data identifying an originator of the request, as discussed above. The SNMP command processor 42 may then determine that the object variable 36-1 has an access status of read-only. The SNMP command processor 42 accesses the object variable 36-N to determine whether the computing device 14 is in the test mode of operation. Because the value of the object variable 36-N is TEST, the computing device 14 is in the test mode of operation, and the SNMP command processor 42 sets the value of the object variable 36-1 to 450, even though the access status of the object variable 36-1 is read-only (step 2012).

The SNMP agent 40, via the trap generator process 47, may then determine that the object variable 36-1 has a non-desirable value because the value 450 is outside the range of desirable values (block 2014). The trap generator process 47 may then generate and cause an alert message to be communicated to the management device 12 (block 2016). The alert message may contain information, such as the value (i.e., 450) of the object variable 36-1, and or text that explains the alert. Note that the exception handling process of the trap generator process 47 is tested without having to raise the actual temperature of the processor device 24 above 100 degrees celsius.

In some embodiments, when the computing device 14 is in the test mode of operation, certain object variables may not be updated. For example, assume that the temperature monitor process 44 obtains the current actual temperature of the processor device 24 from the CPU temperature sensor 28 (block 2018). The temperature monitor process 44 accesses the object variable 36-N and determines that the computing device 14 is in the test mode of operation. Because the computing device 14 is in the test mode of operation, the temperature monitor process 44 does not update the object variable 36-1 with the current temperature (block 2020).

Referring now to FIG. 3B, assume that the SNMP command processor 42 receives, from the management device 12, a command to exit the test mode of operation. In one example, this may occur by receiving an SNMP SET command to set the object variable 36-N to a value of NON-TEST to put the computing device 14 into the non-test mode of operation (step 2022). The SNMP command processor 42 changes the value of the object variable 36-N to NON-TEST to put the computing device 14 in the non-test mode of operation (step 2024). In some embodiments, the SNMP agent 40 may unilaterally put the computing device 14 into the non-test mode of operation if the computing device 14 has been in the test mode of operation for a predetermined amount of time. In such embodiments, the MIB 31 may include an additional read-write object variable that identifies the predetermined amount of time, and which can be set using an SNMP SET command.

In some embodiments, object variables may individually be put into the test mode of operation, while other object variables are in the non-test mode of operation. In particular, object variables for which it may be desirable to test exception handling conditions and/or processes may have corresponding object variables that identify whether the corresponding object variable is in the test mode or the non-test mode of operation. In one example, a table structure may be used to maintain the object variable and data that indicates whether the particular object variable is in the test mode or the non-test mode of operation. Again, the mode of operation may be set using, for example, an SNMP SET command.

In some embodiments, the SNMP agent 40 keeps track of the object variables that are in the test mode of operation. Upon receiving the command to exit the test mode of operation, or upon an expiration of a predetermined period of time, the SNMP agent 40 may obtain a current value of the sensed characteristic maintained in the object variable, such as the current temperature of the processor device 24, and update the object variable with the current value of the sensed characteristic prior to exiting the test mode of operation.

Assume that after the computing device 14 has been put into the non-test mode of operation, the SNMP command processor 42 then receives, from the management device 12, an SNMP SET command to set the object variable 36-1 to a value of 450 (step 2026). The SNMP command processor 42 determines that the object variable 36-1 has an access status of read-only. The SNMP command processor 42 accesses the object variable 36-N to determine whether the computing device 14 is in the test mode of operation. Because the value of the object variable 36-N is NON-TEST, the computing device 14 is in the non-test mode of operation, and the SNMP command processor 42 disregards the SNMP SET command (step 2028). The SNMP command processor 42 generates a message indicating that the read-only object variable 36-1 has a read-only access status and cannot be written to (step 2030).

Figure 4:
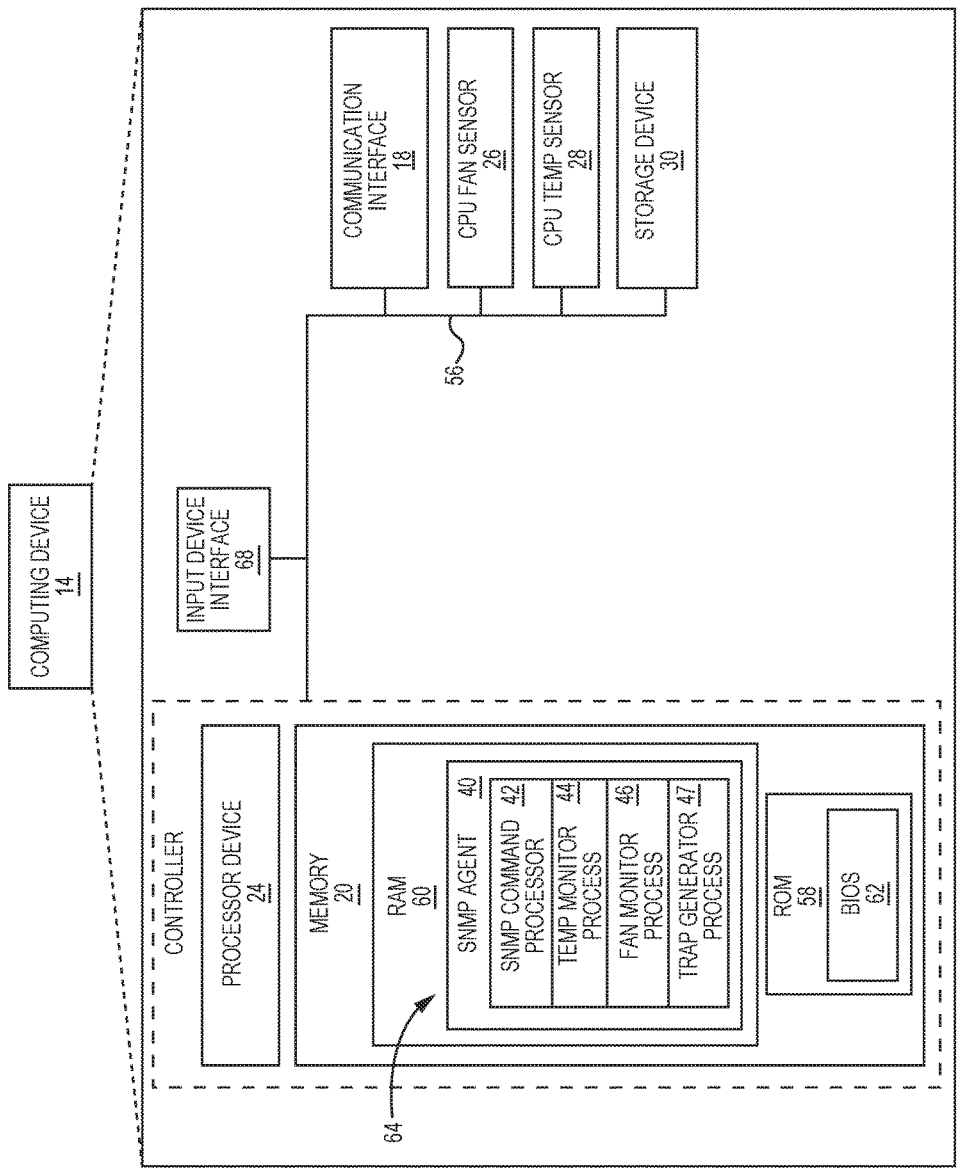
FIG. 4 is a block diagram of a computing device according to one embodiment.

FIG. 4 is a block diagram of the computing device 14 according to one embodiment. The computing device 14 may comprise, for example, a laptop computer, a desktop computer, a personal digital assistant (PDA), a workstation, a server, a network switch, a water flow controller on a ship, or any other computing device comprising a processor device and capable of processing both data and suitable instructions to carry out the functionality described herein. The computing device 14 may include the processor device 24, the memory 20, and a system bus 56. The system bus 56 provides an interface for system components including, but not limited to, the memory 20 and the processor device 24. The processor device 24 can be any of various commercially available or proprietary processors. Dual microprocessors and other multi-processor architectures may also be employed as the processor device 24.

The system bus 56 may be any of several types of bus structures that may further interconnect to a memory bus (with or without a memory controller), a peripheral bus, and/or a local bus using any of a variety of commercially available bus architectures. The memory 20 may include non-volatile memory 58 (e.g., read-only memory (ROM), erasable programmable read-only memory (EPROM), electrically erasable programmable read-only memory (EEPROM), etc.) and/or volatile memory 60 (e.g., random-access memory (RAM)). A basic input/output system (BIOS) 62 may be stored in the non-volatile memory 58, and can include the basic routines that help to transfer information between elements within the computing device 14. The volatile memory 60 may also include high-speed RAM, such as static RAM, for caching data.

The computing device 14 may further include the storage device 30, which may comprise, for example, an internal hard disk drive (HDD) (e.g., enhanced integrated drive electronics (EIDE) or serial advanced technology attachment (SATA)) for storage, flash memory, or the like. The storage device 30 and associated computer-readable and computer-usable media provide non-volatile storage of data, data structures, computer-executable instructions, and the like. Although the description of computer-readable media above refers to an internal HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

During operation, the volatile memory 60 may contain a number of program modules 64, such as the SNMP agent 40, the SNMP command processor 42, the temperature monitor process 44, the fan monitor process 46, and the trap generator process 47, which may implement the functionality described herein in whole or in part.

All or a portion of the embodiments may be implemented as a computer program product, such as a non-transitory computer-usable or computer-readable medium having a computer-readable program code embodied therein. The computer-readable program code can include complex software instructions for implementing the functionality of the embodiments described herein when executed on the processor device 24. The processor device 24, in conjunction with the program modules 64 in the volatile memory 60, may serve as a controller, or control system, for the computing device 14 that is configured to, or adapted to, implement the functionality described herein.

The operator 52 may be able to enter commands and information into the computing device 14 through one or more input devices, such as, for example, a touch-sensitive display (not illustrated), a keyboard (not illustrated), or a pointing device, such as a mouse (not illustrated). Other input devices (not illustrated) may include a microphone, an infrared (IR) remote control, a joystick, a game pad, a stylus pen, or the like. These and other input devices are often connected to the processor device 24 through an input device interface 68 that is coupled to the system bus 56, but can be connected by other interfaces such as a parallel port, an IEEE 1394 serial port, a game port, a universal serial bus (USB) port, an IR interface, etc.

The computing device 14 also includes the communication interface 18, the CPU fan sensor 26, and the CPU temperature sensor 28.

Those skilled in the art will recognize improvements and modifications to the preferred embodiments of the disclosure. All such improvements and modifications are considered within the scope of the concepts disclosed herein and the claims that follow.

What is claimed is:

1. A method for implementing a test mode of operation in a computing device comprising:
receiving, at a computing device comprising a processor device, a first request to set a read-only object variable maintained by the computing device to a first value;
determining, by the computing device, that a current mode of operation of a plurality of different modes of operation is a test mode of operation; and
based on determining that the current mode of operation is the test mode of operation, setting the read-only object variable to the first value.

2. The method of claim 1 wherein receiving the first request to set the read-only object variable maintained by the computing device to the first value comprises:
receiving a simple network management protocol (SNMP) SET command that includes the first value and identifies the read-only object variable.

3. The method of claim 1 further comprising:
receiving, at the computing device, a second request to set the read-only object variable of the computing device to a second value;
determining, by the computing device, that the current mode of operation is a non-test mode of operation; and
based on determining that the current mode of operation is the non-test mode of operation, disregarding the second request.

4. The method of claim 3 wherein receiving the second request to set the read-only object variable maintained by the computing device to the second value comprises receiving a SNMP SET command that includes the second value and identifies the read-only object variable.

5. The method of claim 4 further comprising generating a message indicating that the read-only object variable has a read-only status and cannot be written to.

6. The method of claim 1 wherein the first request includes data identifying an originator of the first request, and further comprising:
determining that the originator of the first request is authorized to set the read-only object variable to the first value; and
wherein setting the read-only object variable to the first value is further based on determining that the originator of the first request is authorized to set the read-only object variable to the first value.

7. The method of claim 1 further comprising:
prior to receiving the first request, receiving first data from a sensor that quantifies a sensed characteristic of the computing device, the sensed characteristic being variable over time;
determining that the current mode of operation is a non-test mode of operation; and
based on the first data and the current mode of operation, setting the read-only object variable to a value that quantifies the sensed characteristic.

8. The method of claim 7 wherein the sensed characteristic comprises one of a temperature, a moisture, a voltage, a fan speed, and an optical emission power.

9. The method of claim 7 further comprising:
receiving second data from the sensor that quantifies the sensed characteristic of the computing device;
determining that the current mode of operation is the test mode of operation; and
based on the current mode of operation, inhibiting updating the read-only object variable.

10. The method of claim 1 further comprising:
determining that the read-only object variable has a value that is a non-desirable value; and based on determining that the value is the non-desirable value, transmitting, to a network manager device, an alert message.

11. The method of claim 1 further comprising:
receiving, at the computing device, a command to exit the test mode of operation;
receiving data from a sensor that quantifies a sensed characteristic of the computing device, the sensed characteristic being variable over time;
based on the data, setting the read-only object variable to a value that quantifies the sensed characteristic; and
setting the current mode of operation to a non-test mode of operation.

12. The method of claim 1 further comprising:
determining that the computing device has been in the test mode of operation for a predetermined period of time; and
based on determining that the computing device has been in the test mode of operation for the predetermined period of time:
  receiving data from a sensor that quantifies a sensed characteristic of the computing device, the sensed characteristic being variable over time;
  based on the data, setting the read-only object variable to a value that quantifies the sensed characteristic; and
  setting the current mode of operation to a non-test mode of operation.

13. A computing device comprising:
a communication interface configured to communicate with a network;
a processor device coupled to the communication interface configured to:
  receive a first request to set a read-only object variable maintained by the computing device to a first value;
  determine that a current mode of operation of a plurality of different modes of operation is a test mode of operation; and
  based on determining that the current mode of operation is the test mode of operation, set the read-only object variable to the first value.

14. The computing device of claim 13 wherein to receive the first request to set the read-only object variable maintained by the computing device to the first value, the processor device is further configured to:
receive a simple network management protocol (SNMP) SET command that includes the first value and identifies the read-only object variable.

15. The computing device of claim 13 wherein the processor device is further configured to:
receive a second request to set the read-only object variable of the computing device to a second value;
determine that the current mode of operation is a non-test mode of operation; and
based on determining that the current mode of operation is the non-test mode of operation, disregard the second request.

16. The computing device of claim 13 wherein the processor device is further configured to:
prior to receiving the first request, receive first data from a sensor that quantifies a sensed characteristic of the computing device, the sensed characteristic being variable over time;
determine that the current mode of operation is a non-test mode of operation; and
based on the first data and the current mode of operation, set the read-only object variable to a value that quantifies the sensed characteristic.

17. The computing device of claim 16 wherein the processor device is further configured to:
receive second data from the sensor that quantifies the sensed characteristic of the computing device;
determine that the current mode of operation is the test mode of operation; and
based on the current mode of operation, inhibit updating the read-only object variable.

18. A computer program product for implementing a test mode of operation in a computing device, the computer program product stored on a non-transitory computer-readable storage medium and including instructions to cause a processor device to:
receive a first request to set a read-only object variable maintained by the computing device to a first value;
determine that a current mode of operation of a plurality of different modes of operation is a test mode of operation; and
based on determining that the current mode of operation is the test mode of operation, set the read-only object variable to the first value.

19. The computer program product of claim 18 wherein to receive the first request to set the read-only object variable maintained by the computing device to the first value, the instructions further cause the processor device to:
receive a simple network management protocol (SNMP) SET command that includes the first value and identifies the read-only object variable.

20. The computer program product of claim 18 wherein the instructions further cause the processor device to:
receive a second request to set the read-only object variable of the computing device to a second value;
determine that the current mode of operation is a non-test mode of operation; and
based on determining that the current mode of operation is the non-test mode of operation, disregard the second request.

* * * * *